United States Patent [19]

Marty

[11] E Patent Number: Re. 32,981

[45] Reissued Date of Patent: Jul. 11, 1989

[54] ANTI-SIPHON AND ANTI-KNOCK DIVERTER VALVE

[75] Inventor: Garry R. Marty, Noblesville, Ind.

[73] Assignee: Masco Corporation, Taylor, Mich.

[21] Appl. No.: 137,993

[22] Filed: Dec. 28, 1987

Related U.S. Patent Documents

Reissue of:

[64] Patent No.: 4,577,653
Issued: Mar. 25, 1986
Appl. No.: 509,302
Filed: Jun. 30, 1983

[51] Int. Cl.[4] ..... F16K 11/02

[52] U.S. Cl. ..... 137/119; 137/454.2

[58] Field of Search ..... 137/119, 116, 315, 454.2; 251/366, 367; 285/DIG. 22

[56] References Cited

U.S. PATENT DOCUMENTS

| | | |
|---|---|---|
| 2,587,961 | 3/1952 | Bletcher et al. . |
| 2,647,530 | 8/1953 | Jaquith . |
| 2,769,454 | 11/1956 | Bletcher et al. . |
| 2,949,933 | 8/1960 | Moen . |
| 2,998,824 | 9/1961 | Ward . |
| 3,056,418 | 10/1962 | Adams et al. . |
| 3,232,307 | 2/1966 | Bucknell et al. . |
| 3,336,935 | 8/1967 | Ward et al. . |
| 3,376,884 | 4/1968 | Bucknell et al. . |
| 3,461,901 | 8/1969 | Bucknell et al. . |
| 3,588,040 | 6/1971 | Ward . |
| 4,008,732 | 2/1977 | Fichter et al. . |
| 4,123,089 | 10/1978 | Viero et al. . |
| 4,372,586 | 2/1983 | Rosenberg et al. . |

FOREIGN PATENT DOCUMENTS

| | | |
|---|---|---|
| 876502 | 7/1971 | Canada . |
| 1223276 | 2/1971 | United Kingdom . |

OTHER PUBLICATIONS

Delta Faucet Co.: Routine Maintenance Instructions.
Bahroos, Diverter valve drawing.

*Primary Examiner*—Alan Cohan
*Attorney, Agent, or Firm*—Steven L. Permut; Malcolm L. Sutherland

[57] ABSTRACT

A diverter valve 10 has a two piece housing 22 including a lower member 24 and an upper member 26 securely snap fitted together within a cavity 12 of a faucet body 14. The housing 22 has a piston valve assembly 28 slidably mounted therein for movement between a first position which allows water to flow through a spout and a second position which allows water to flow to a spray head. The diverter valve has prongs 72 which resiliently bias the spool assembly 28 to the first position to reduce chattering of the valve assembly and to provide a back-up anti-siphon system.

16 Claims, 2 Drawing Sheets

FIG. 1.
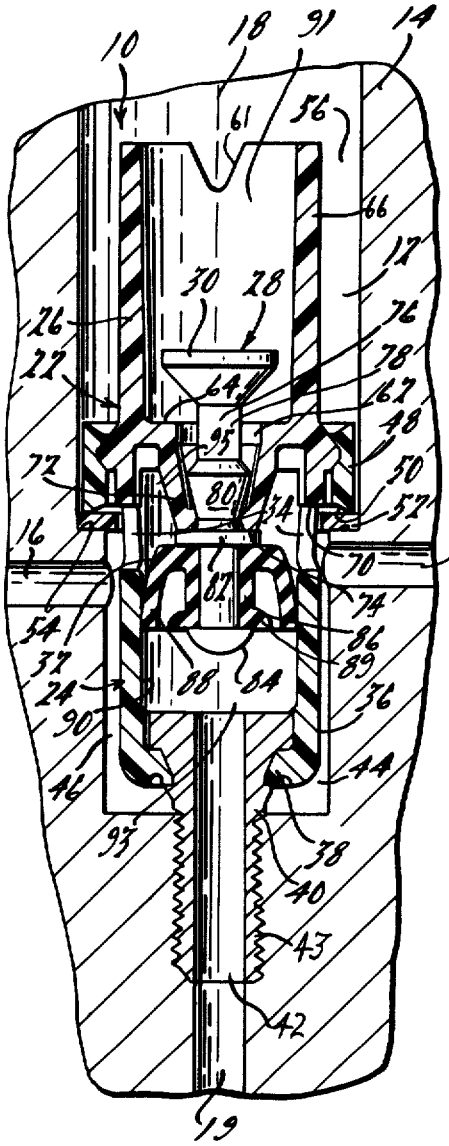
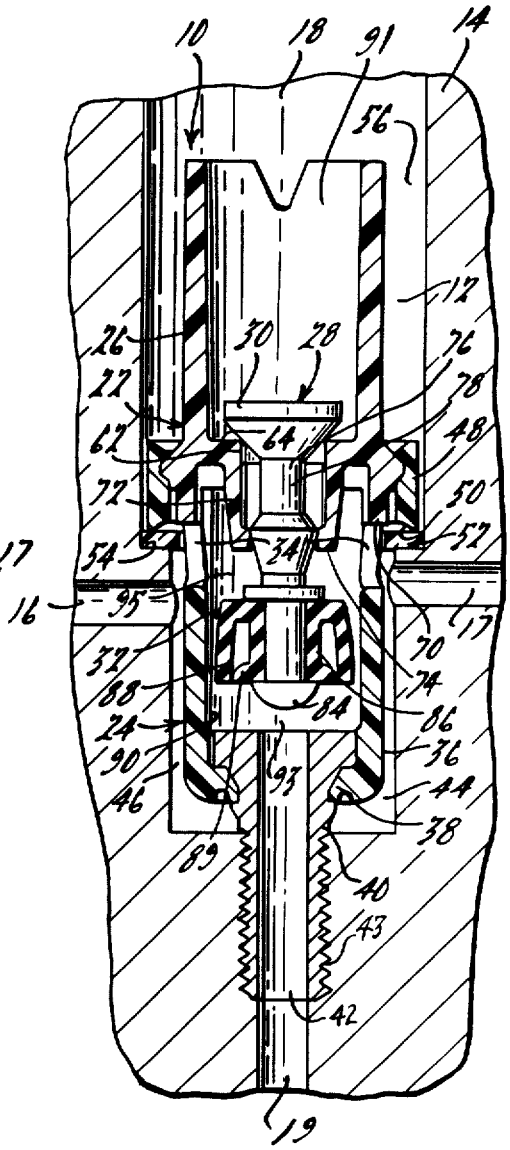
FIG. 6.

ANTI-SIPHON AND ANTI-KNOCK DIVERTER VALVE

Matter enclosed in heavy brackets [ ] appears in the original patent but forms no part of this reissue specification; matter printed in italics indicates the additions made by reissue.

TECHNICAL FIELD

This invention relates to valve assemblies and more particularly to a diverter valve that incorporates an anti-siphon mechanism and an anti-knock mechanism.

DISCLOSURE INFORMATION

A diverter valve is commonly used in a faucet assembly to divert water to either the spout or hand spray. In kitchen [sinks] *faucets* it is common to have the water pass through a spout or a separate hand spray. The diverter valve assembly shuts off the flow through the faucet spout when the spray is operated. When the spray is shut off, the diverter valve automatically repositions to allow flow of water to the spout.

Diverter valve assemblies have been made in cartridge form. The cartridge slips into a cavity within the faucet body. Often the inlet to the cavity is on a side wall of the cavity and a first and second outlet, leading to the spout and spray respectively, are on opposite ends of the cavity.

Diverter valves have also incorporated a check valve or similar mechanism which prevents siphoning of water back through the hand spray and through the inlet to the water supply lines if per chance there is a negative pressure in the water supply lines and the hand spray is simultaneously submerged in water.

Many diverter valves have a problem with knocking, commonly referred to as chattering. Knocking occurs when a valve spool is quickly moved from one position to the second position and rebounds back thereby producing an audible hammering effect in the water line. The shuttling of the valve spool can occur a multiple number of times with the knocking loud enough that a person may believe that the faucet assembly needs immediate repair.

What is needed is an inexpensive diverter valve [cartridge] which prevents siphoning and reduces knocking.

SUMMARY OF THE INVENTION

According to *one embodiment of* the invention, a diverter valve assembly includes a housing comprising a first member snap fitted to a second member. A valve assembly is mounted in the housing to divert fluid flow to either a spray outlet or a spout outlet. The housing fits within the cavity of a faucet body. The cavity has an inlet in communication with an inlet of the housing. The cavity also has at opposite ends thereof a spout outlet and spray outlet in communication with respective first and second outlets in the housing. The housing sits in the cavity associated with a seal to seal the cavity inlet from the cavity outlets such that fluid must flow through the housing to get from the cavity inlet to either of the cavity outlets.

In one embodiment, the first member of the housing includes a first outlet circumscribed by a valve seat. The second member includes an inlet and a second outlet. The valve assembly includes a valve element mounted at the first outlet and movable between a seated closed position on the exterior side of the first outlet and an open position. The valve element is connected via a spool extending through the first outlet to a piston operably slidable within the second member. The piston is movable between a first and second position and is responsive to a pressure differential between the second outlet and the inlet such that when a lower pressure exists at the second outlet, the piston moves to the second position and causes the valve element to move to its closed position *against the valve seat*. The piston includes an annular lip valve such that when in the second position, fluid can pass by the lip valve from the inlet to the second outlet.

The resilient biasing mechanism biases the valve to its open position and the piston to its first position to open the valve and allow water to flow to the faucet spout when the pressure differential between the inlet and second outlet is below a predetermined minimum. The biasing mechanism preferably includes a plurality of axially extending prongs integral with the first member of the housing. The prongs are circumferentially spaced about the first outlet and engage a tapered section of the spool. The prongs are resiliently flexible and press against the tapered section to force the spool upward to open the valve and lift the piston to its first position. The prongs abut a flange on the spool adjacent tapered section to limit the opening motion of the valve and the lifting of the piston.

In broader terms, one aspect of the invention relates to a diverter valve assembly having a housing with an inlet and first and second outlets. A valve element is mounted about the first outlet and movable between a seated closed position and an open position. A piston mechanism is operably connected to the valve element and is slidable within a section of the housing in response to a pressure differential between the second outlet and the inlet to move the valve element to its closed position. A resilient biasing means biases the valve element and piston to the respective open and first positions when a pressure differential below a predetermined minimum exists between the inlet and the second outlet of the housing. The housing is constructed to fit within a cavity of a faucet body to seal the body inlet from the body outlet such that fluid must flow through the housing.

*In broader terms, another aspect of the invention relates to a diverter valve mounted in a cavity of a faucet body. The faucet body has a first and second outlet. The diverter valve includes a valve seat member having an aperture in selective communication with said first outlet and valve element mounted for movement to one of a closed or open position to open or close said aperture to said first outlet. A pressure responsive mechanism is operably connected to said valve element and operable to a first and second position in response to a pressure differential between the second outlet in said faucet body and an inlet in said faucet body. A resilient biasing means biases the valve element and pressure responsive mechanism to the respective open and first positions.*

The invention provides for a diverter valve that reduces chattering i.e. knocking.

BRIEF DESCRIPTION OF THE DRAWING

Reference now will be made to the accompanying drawings in which:

FIG. 1 is a cross-sectional side elevational view of a diverter valve according to the present invention;

FIG. 6 is a view similar to FIG. 1 showing the diverter valve in a second position.

DETAILED DESCRIPTION OF THE PREFERRED EMBODIMENT

Figure 2:
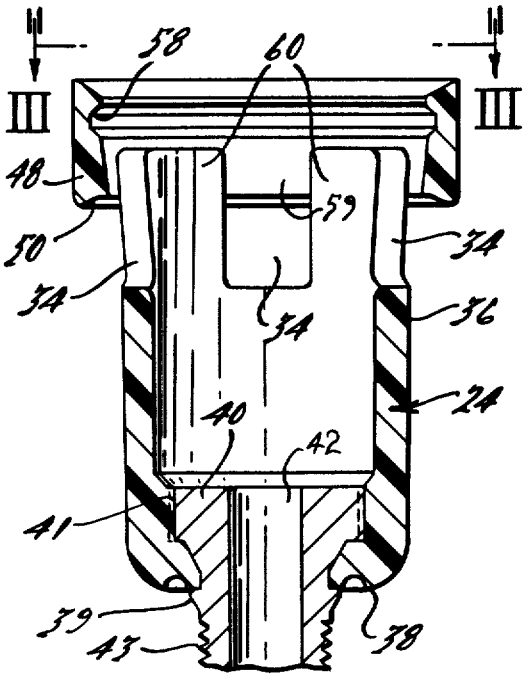
FIG. 2 is a cross-sectional side elevational view of the lower housing member and fitting assembly.

Referring to FIG. 1, a diverter valve 10 fits within a cavity 12 within a faucet body 14. The diverter valve 10 controls the flow of water from inlets 16 and 17 to either a spout outlet 18 or a spray outlet 19. Commonly inlets 16 and 17 are operably connected to valved hot and cold water supplies respectively. Diverter valve 10 includes a two piece housing 22 comprised of a lower member 24 and an upper member 26 snap fitted together. Each member 24 and 26 is made from a resilient plastic material such as celcon M90-04 which provides the necessary deformation of the housing members in order for them to snap fit together. A valve spool assembly 28 has a valve element 30 and an elastomeric lip valve member 32. The valve spool 28 is slidably mounted within the housing 22.

Figure 3:
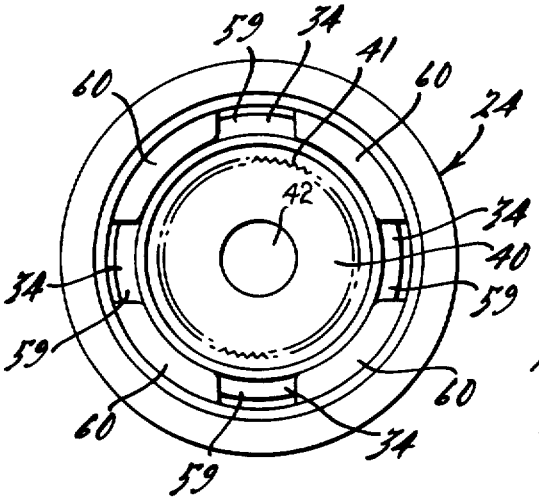
FIG. 3 is an end view of the bottom housing member taken along lines III—III shown in FIG. 2.

In more detail, as shown in FIGS. 1, 2 and 3, the lower member 24 has a plurality of inlets 34 on a side wall 36 thereof. At the lower end 38, a brass fitting 40 is pressed fitted therethrough. The brass fitting 40 has serrations 41 that engage the plastic material to prevent the fitting 40 from rotating within member 24. In addition, the brass fitting has a flange 39 which snap fittingly engages the end 38 of member 24. The brass fitting 40 has threaded section 43 threaded into the threaded spray head outlet 19 in faucet body 14. The fitting 40 has an aperture 42 to allow water to flow to outlet 19 from housing member 24. The wall 34 has an outer diameter smaller than the lower portion 44 of cavity 12 such that an annular clearance 46 exists therebetween.

The top portion 48 of member 24 has an enlarged diameter and forms a shoulder 50 which is seated on an annular seal 52. The seal 52 rests on a shoulder 54 of cavity 12 to seal the lower portion 44 of cavity 12 from the upper portion 56 of cavity 12. The enlarged top portion 48 has an interior facing circumferential groove 58. Radially inwardly extending shoulders 60 are interposed between the inlets 34 and extend above the inlets 34. The shoulders 60 form gaps 59 therebetween.

Figure 4:
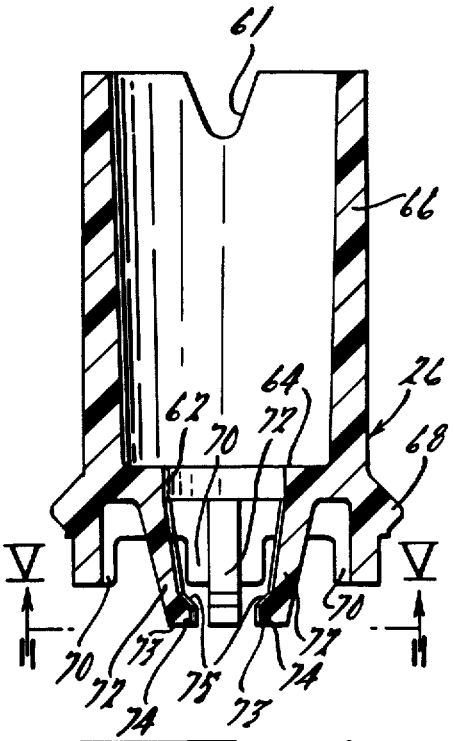
FIG. 4 is a fragmentary cross-sectional side elevational view of the upper housing member shown in FIG. 1.
Figure 5:
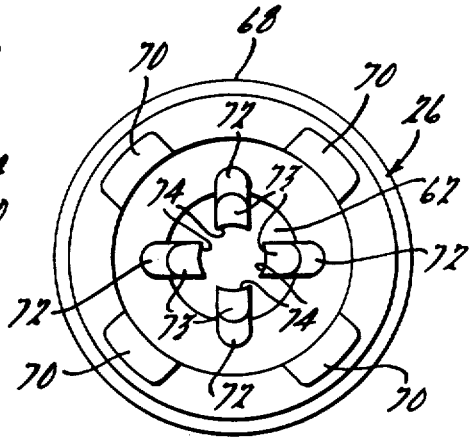
FIG. 5 is an end view of the housing taken along line V—V in FIG. 4.

Referring now to FIGS. 1, 4 and 5, the upper member 26 has a generally tubular section 66 having notches 61 at the upper end for engagement with a screwdriver. An annular valve seat 64 is at the lower end with an aperture 62 therethrough. An annular rim 68 is complementarily sized to groove 58 of lower member 24. Downwardly extending from rim 68 are depending tabs 70 which are sized to fit in the gaps 59 between adjacent shoulders 60 in the lower member 24 to prevent rotation of the two members 24 and 26. Depending from the valve seat 64 and circumferentially spaced about aperture 62 are a plurality of downwardly extending resiliently flexible prongs 72. Each prong 72 radially extends inwardly as well as downwardly. Each prong 72 has a lower flange 74 which radially inwardly extends toward the longitudinal axis of the housing 22. Each flange 74 has a flat lower side 73 and a canted upper side 75.

The valve spool assembly 28, as shown in FIG. 1, includes a brass spool 76 which incorporates the valve element 30, a cylindrical section 78, a tapered section 80, an outwardly annular flange section 82, and semi-spherical head section 84. The valve element 30 is seatable on valve seat 64. The spool 76 extends through aperture [84] *62*. Tapered section 80 abuts lower flanges 74 of prongs 72.

The lip valve member 32 has a tubular inner section 86 which is seated between the flange section 82 and head section 84 of spool 76. The lip valve member 32 has an outer flexible lip 88 slidably engaging the inner wall 90 of the lower member 24. The tubular section 86 has [a] *an* annular shoulder 89 that acts as a stop for lip 88 when it flexes inward.

The valve spool *assembly* 28 [creates] *defines in part* three separate chambers[,] *;* chamber 91 above valve element 30 and in communication with outlet 18, chamber 93 below lip valve member 32 and in communication with outlet 19, and chamber 95 between valve element 30 and lip valve member 32 and in communication with inlets 16 and 17.

[Assemblage] *Assembly* of the diverter valve 10 is a simple five step process. Firstly, the brass fitting 40 is pressed fit into the end 38 of member 24. Secondly, the brass spool 76 is inserted through the tubular section 66 of upper member 26. The canted upper side 75 of the prongs 72 allows the prongs to flex away when they engage the semi-spherical head section 84 and the flange section 82 of brass spool 76. The lip valve member 32 is then assembled onto the spool 76. The upper member 26 is then snap fitted to the lower member 24 to form housing 22. The annular seal 52 is then positioned about the housing 22 and the housing 22 is placed within the cavity 12 and rotated by a screw driver such that the brass fitting 40 is threaded into the spray outlet 19. The thread connected between the fitting 40 and outlet 19 is leakless.

In operation, when the water is shut off, the valve head is in the upper position as shown in FIG. 1. When the faucet is first turned on and the spray (not shown) is shut off, water flows through the inlets 16, 17 and 34 creating a high pressure in chamber 95. Chambers 91 and 93 are initially at ambient pressures. Because the lip valve has a larger diameter than the valve element 30, the spool 76 initially moves downward. Water is able to be displaced in chamber 93 by the downward movement of spool 76 because of the flexibility of the tubing (not shown) connecting outlet 19 to the spray (not shown). The prongs 72 are constructed to be stiffer than lip 88 of lip valve 32 so that, simultaneous to the downward movement of spool assembly 28, water passes by lip 88 equalizing the pressure in chambers 95 and 93. The upward bias of prongs 72, the frictional engagement of prongs sections 74 on tapered section 80, and the relative flexibility of lips 88 compared to prongs 72 allow the chambers 95 and 93 to equalize before the valve element 30 of spool 76 becomes seated on seat 64 about aperture 62.

As the pressure differential between chambers 93 and 95 drops below a predetermined minimum, the prongs 72 bias the valve spool assembly 28 upwardly. As the lip valve member 32 moves upwardly, the pressure differential is again increased which again reverses the direction of motion and a second, downward movement of lesser magnitude occurs. The shuttling may normally occur two to six times before finally ceasing. However, the first and subsequent shuttles of the spool assembly 28 are normally restrained within limits that prevent the closing off of chamber 91 from chamber 95 which could cause a knock or severe vibration.

The valve spool assembly 28 attains the position shown in FIG. 1 after its shuttling is finally dampened. The prongs 72 have flat ends 73 abut flange 82 on spool 76 to define the upward limit of movement of valve spool assembly 28. *Water flows from one or both inlets 16 and 17 through inlets 34 and out through aperture 62 which functions as an outlet for chamber 95 which allow fluid flow to outlet 18.*

The lower the pressure differential between chambers 93 and 95, the more effective the prongs 72 are in preventing undesirable knocking. The prongs are effective to a pressure of about 50 psi, a pressure above most water supplies. Above 50 psi, the pressure differential acting on lip valve member 32 becomes excessive and overcomes the upward bias of the prongs 72 and damping effect of flanges 74 thereby causing the valve element 30 to hit against shoulder 64 resulting in a single knock. Even with water supply having excessive pressure, as pressure differential between chambers 93 and 95 becomes less, the prongs regain their effectiveness to prevent further repetitive knocks.

If the spray is turned on, water supplied from the inlets 16 and 17 creates a high pressure in chamber 95 while a low pressure is created in chamber 93 which allow the pressure from the water supply to press down on the lip valve member 32. The water supply should be at least 15 psi in order for the valve 10 to operate effectively. The lip valve member 32 functions as a piston and moves the spool assembly 28 downwardly until it retains the position shown in FIG. 6. The lip 88 deflects inwardly toward shoulder 89 and water is allowed to pass by the lip 88 into chamber 93 and through the outlet 19. The valve element 30 is seated on valve seat 64 closing off the aperture 62 leading to chambers 91 and outlet 18. The spout outlet 18 therefore receives no water when the spray is turned on.

When the spray valve (not shown) is closed, chambers 93 and 95 are momentarily equalized. The pressure acts upon the valve element 30 to force the spool 76 upwardly. As soon as the spool 76 moves upwardly, the chamber 93 becomes a low pressure area that wants to pull down on the valve spool assembly 28. The prongs 72 resist the downward movement of valve spool assembly 28 as described before for when water is initially turned on and allows water to pass by lip 88 before the valve element 30 bottoms against seat 64. After the shuttling ceases, the valve spool assembly 28 again attains the position shown in FIG. 1.

The prongs 72 are resiliently flexible such that when the water supply is shut off, the valve [piston] *spool* assembly 28 is biased to the position shown in FIG. 1. In addition, engagement of the flange 74 with the tapered section provides for a certain amount of friction which dampens the motion of the valve spool assembly 28. In this way, excessive shuttling of the valve spool assembly 28 is eliminated thereby preventing the valve element 30 from closing on shoulder 64 and eliminating repetitive hammer-like knocking.

In adddition, the diverter valve 10 has an anti-siphon feature. Firstly, the lip 88 acts as a check valve and allows water to flow only from the inlets 16 and 17 to the outlet 19. If the water supply attains a negative pressure and the spray head is accidentally left in an open position in a sink full of water, the lip 88 prevents siphoning of the sink water back to the water supply.

In addition, the prongs 72 provides a backup anti-siphon mechanism. If per chance the lip is faulty and allows water to leak in the upstream direction, the valve element 30 is biased to the open position by prongs 72 such that if there is any negative pressure in the water supply, air is aspirated through the outlet 18 and through the open aperture 62. The aspiration of air prevents water from flowing backward from outlet 19 and by the lip 88.

The prongs 72 provide three distinct advantages. Firstly, they prevent excessive shuttling of the valve member and the consequential repetitive knocking. Secondly, the prongs act as a stop for limiting the upward movement of the valve member and piston. Thirdly, the prongs provide a backup anti-siphon feature by opening the valve for allowing air to be aspirated if necessary.

In this fashion, a diverter valve assembly is easily and inexpensively manufactured while providing both an anti-chatter feature and an anti-siphon feature. In addition, the cartridge provides for easy installation in a faucet body.

Variations and modifications of the present invention are possible without departing from its spirit and scope as defined by the appended claims.

The embodiments of the invention in which an exclusive property or privilege is claimed are defined as follows:

1. A diverter valve assembly characterized by:

a housing having an inlet, a first outlet and a second outlet;

said housing comprising a first member and a second member snap-fitted to said first member;

said second member including said inlet and said second outlet;

said first member includes said first outlet;

a valve element mounted in said first [section] *member* movable between a closed position and an open position with respect to said first outlet;

a piston means for moving said valve element and positioned in said second [section] *member* with said piston means being responsive to pressure differential between said second outlet and said inlet for movement to a first and second position such that when a lower pressure exists at said second outlet, said piston means moves to said second position and moves said valve element to said closed position;

means for passing fluid from said inlet to said second outlet by said piston means;

said housing positionable in a body defining a valve chamber having a first body outlet, a second body outlet, and a body inlet; said housing seated in said chamber; said valve chamber being open to said inlet or said outlets through said body and capable of being totally filled with fluid flowing from said inlet to both outlets; said second [section] *member* includes an end section fixedly engageable to said second body outlet; said end section has a longitudinal aperture therethrough defining said second outlet; and sealing means associated with said housing for sealing said body inlet from said body outlets such that fluid flowing from said body inlet, through said chamber and to said body outlets flows through said housing.

2. A diverter valve assembly characterized by:

a housing having an inlet, a first outlet and a second outlet;

said housing comprising a first member and a second member snap-fitted to said first member;

said second member including said inlet and said second outlet;

said first member includes said first outlet;

a valve element mounted in said first [section] *member* movable between a closed position and an open position with respect to said first outlet;

a piston means for moving said valve element and positioned in said second [section] *member* with said piston means being responsive to pressure differential between said second outlet and said inlet for movement to a first and second position such that when a lower pressure exists at said second outlet, said piston means moves to said second position and moves said valve element to said closed position;

means for passing fluid from said inlet to said second outlet by said piston means;

said housing positionable in a body defining a valve chamber having a first body outlet, a second body outlet, and a body inlet; said housing seated in said chamber; said valve chamber being open to said inlet or said outlets through said body and capable of being totally filled with fluid flowing from said inlet to both outlets; said second [section] *member* includes an end section fixedly engageable to said second body outlet; said end section has a longitudinal aperture therethrough defining said second outlet;

sealing means associated with said housing for sealing said body inlet from said body outlets such that fluid flowing from said body inlet, through said chamber and to said body outlets flows through said housing;

said second member has an enlarged section with an internally facing circumferential groove;

a plurality of circumferential shoulders are positioned below said groove and are spaced apart to form gaps therebetween;

said first member has an outwardly extending rim sized to fit in said groove; and a plurality of tabs extend below said rim and are sized to fit in said gaps to non-rotatably secure said first and second members together.

3. A diverter valve as defined in claim 2 wherein:

said second member includes a fitting pressed fitted at an end thereof; and said fitting has a longitudinal aperture therethrough defining said second outlet with said fitting threadably engageable to said second body outlet.

4. A diverter valve as defined in claim 1 wherein said first member has an integral stop means for stopping movement in one direction of said piston means and said valve element when said piston means and valve element are in their respective first and open positions.

5. A diverter valve as defined in claim 1 wherein:

said second member has its end section including a pressed fitting; and said fitting has a longitudinal aperture therethrough defining said second outlet with said fitting threadably engageable to said second body outlet.

6. A diverter valve assembly characterized by:

a hollow housing having an inlet, a first outlet, and a second outlet;

a valve element movable between a closed position and an open position with respect to said first outlet;

a piston means for moving said valve element and positioned in said housing between said inlet and said second outlet with said piston means being responsive to a pressure differential between said second outlet and said inlet for movement between a first position and second position such that when a lower pressure is at said second outlet, said piston moves to said second position and moves said valve element to said closed position;

passage means for passing fluid from said inlet to said second outlet by said piston means;

a resilient biasing means for biasing said valve element and said piston means to said respective open and first positions when the pressure at said second outlet is not lower than the pressure at said inlet by a predetermined amount;

said resilient biasing means including axially extending and resiliently flexible prongs;

said prongs being mounted about said first outlet and having outer ends frictionally engaging a tapered surface of a spool connecting the valve element to the piston for biasing said spool and damping motion of said spool; and said stop means including said prongs engaging a flange on said spool adjacent said tapered section of said spool.

7. A diverter valve assembly as defined in claim 6 further characterized by:

a stop means for limiting movement of said valve element when said piston means and valve elements in one direction are in said respective open and first positions.

8. A diverter valve assembly as defined in claim 6 wherein:

said piston means includes a resiliently flexible check valve means for allowing fluid to flow from said inlet to said second outlet at a predetermined pressure differential between said inlet and said second outlet; and said resiliently flexible prongs having a greater resilient rate than said resiliently flexible check valve such that, said pressure differential between said second outlet and said inlet causes said resiliently flexible check valve to let fluid pass thereby to said second outlet.

9. A diverter valve assembly characterized by:

a hollow housing having an inlet, a first outlet, and a second outlet;

a valve element movable between a closed position and an open position with respect to said first outlet;

a piston means for moving said valve element and positioned in said housing between said inlet and said second outlet with said piston means being responsive to a pressure differential between said second outlet and said inlet for movement between a first position and second position such that when a lower pressure is at said second outlet, said piston moves to said second position and moves said valve element to said closed position;

passage means for passing fluid from said inlet to said second outlet by said piston means;

a resilient biasing means for biasing said valve element and said piston means to said respective open and first positions when the pressure at said second outlet is not lower than the pressure at said inlet by a predetermined amount;

said resilient biasing means including axially extending and radially inwardly extending resiliently flexible prongs; and said prongs being mounted about said first outlet and an outer end of said prongs frictionally engaging a tapered section of a spool connecting the valve element to the piston for biasing said spool and damping motion of said spool.

10. A diverter valve assembly characterized by:

a housing having an inlet and first and second outlets;

said housing comprising a first section and second section;

said first section including said first outlet circumscribed by a valve seat;

said second section including said inlet and said second outlet;

a valve element mounted in said first housing section movable between a seated closed position on said valve seat and an open position;

a piston means for moving said valve element and slidably mounted in said second section;

said piston means being responsive to a pressure differential between said second outlet and said inlet for movement between a first and second position such that when a lower pressure exists at said second outlet and said inlet, said piston means moves to said second position and moves said valve element to said closed position;

means for passing fluid from said inlet to said second outlet by said piston means;

said housing positionable in a body defining a valve chamber having a first body outlet and second body outlet and a body inlet;

said housing sealing said body inlet from said body outlets such that fluid flowing from said body inlet to said body outlets flows through said housing;

a resilient biasing means for biasing said valve element and said piston means to said respective open and first positions when a pressure at said second outlet is not lower than the pressure in said inlet by a predetermined amount;

said resilient biasing means includes axially extending and resiliently flexible prongs;

said prongs mounted about said first outlet and having outer ends frictionally engaging a tapered section of a spool connecting the valve element to the piston means for biasing said spool and damping motion of said spool.

11. A diverter valve assembly characterized by:

a housing having an inlet and first and second outlets; said housing comprising a first section and second section;

said first section including said first outlet circumscribed by a valve seat;

said second section including said inlet and said second outlet;

a valve element mounted in said first housing section movable between a seated closed position on said valve seat and an open position;

a piston means for moving said valve element and slidably mounted in said second section;

said piston means being responsive to a pressure differential between said second outlet and said inlet for movement between a first and second position such that when a lower pressure exists at said second outlet and said inlet, said piston means moves to said second position and moves said valve element to said closed position;

means for passing fluid from said inlet to said second outlet by said piston means;

said housing positionable in a body defining a valve chamber having a first body outlet and second body outlet and a body inlet;

said housing sealing said body inlet from said body outlets such that fluid flowing from said body inlet to said body outlets flows through said housing; and a resilient biasing means for biasing said valve element and said piston means to said respective open and first positions when a pressure at said second outlet is not lower than the pressure in said inlet by a predetermined amount;

a stop means for stopping movement in one direction of said valve element and said piston means when said valve and said piston means are in said respective open and first positions;

said resilient biasing means including axially extending and radially inwardly extending resiliently flexible prongs;

said prongs being mounted about said first outlet and having free ends engaging a tapered surface of a spool connecting the valve element to the piston; and said stop means including said prongs engaging a flange adjacent said tapered section on said spool.

12. A diverter valve assembly as defined in claim 11 wherein:

said piston means includes a valve resiliently flexible check means for allowing fluid to flow from said inlet to said second outlet at a predetermined pressure differential between said inlet and said second outlet;

said resiliently flexible prongs having a greater resilient rate than said resiliently flexible check valve such that said pressure differential between said second outlet and said inlet causes said resiliently flexible check valve to let fluid pass thereby to said second outlet.

*13. A diverter valve assembly characterized by:*

*a valve seat member positionable in a valve chamber within a body;*

*said valve chamber having a first body outlet, a second body outlet, and a body inlet;*

*a valve element movably mounted to one of an open or closed position with said valve seat member such that when in the open position, fluid is allowed to flow from said inlet to said first outlet and when in the closed position, fluid does not flow from said inlet to said first outlet;*

*a pressure responsive means for moving said valve element between said closed and open position with said pressure responsive means being responsive to a pressure differential between said inlet and said second outlet such that when a lower pressure is at said second outlet, said pressure responsive means moves said valve element to said closed position such that flow from said inlet is directed through said second outlet;*

*a resilient biasing means for biasing said valve element to said open position when the pressure at said second outlet is not lower than the pressure at said inlet by a predetermined amount;*

*said resilient biasing means including axially extending and resiliently flexible prongs depending from said valve seat member and having a section frictionally*

*engaging a tapered surface of a spool connected to said valve element for biasing said spool and for damping motion of said spool.*

*14. A diverter valve assembly as defined in claim 13 further characterized by:*

*said spool having a flange adjacent said tapered section for engaging said prongs and providing a stop for said spool to limit motion of the valve in one direction when said valve is in its open position.*

*15. A diverter valve as defined in claim 13 further characterized by:*

*said spool connecting said valve element to said pressure responsive means.*

*16. A diverter valve assembly characterized by:*

*a valve seat member positionable in a valve chamber within a body;*

*said valve chamber having a first body outlet, a second body outlet, and a body inlet;*

*a valve element movably mounted to one of an open or closed position with said valve seat member such that when in the open position, fluid is allowed to flow from said inlet to said first outlet and when in the closed position, fluid does not flow from said inlet to said first outlet;*

*a pressure responsive means for moving said valve element between said closed and open position with said pressure responsive means being responsive to a pressure differential between said inlet and said second outlet such that when a lower pressure is at said second outlet, said pressure responsive means moves said valve element to said closed position such that flow from said inlet is directed through said second outlet;*

*a resilient biasing means for biasing said valve element to said open position when the pressure at said second outlet is not lower than the pressure at said inlet by a predetermined amount;*

*said resilient biasing means being integrally formed with said valve seat member.*

* * * * *